Aug. 17, 1926.
C. KÜBLER ET AL
CALCULATING MACHINE
Filed Jan. 15, 1921  5 Sheets-Sheet 1
1,596,108
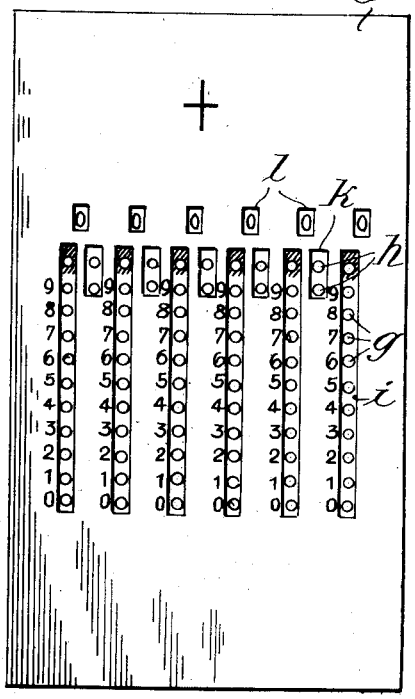
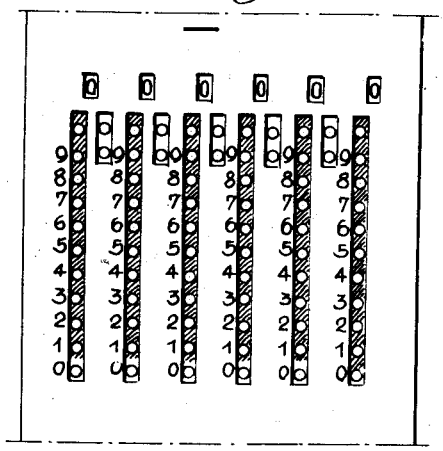
Inventors:
Carl Kübler
Otto Minter Aug. 17, 1926.
C. KÜBLER ET AL
1,596,108
CALCULATING MACHINE
Filed Jan. 15, 1921    5 Sheets-Sheet 2
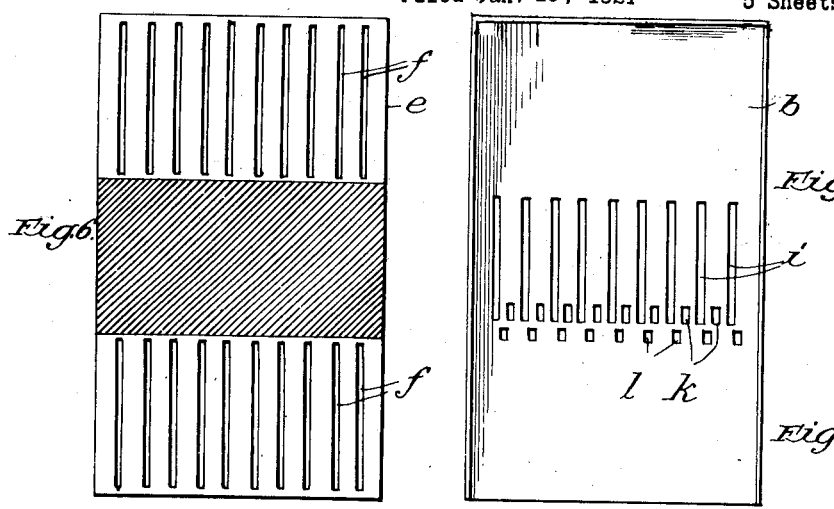
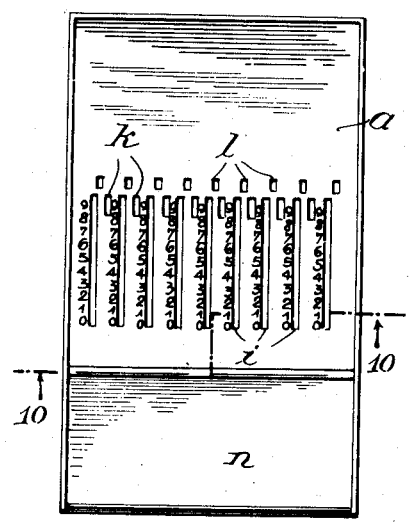
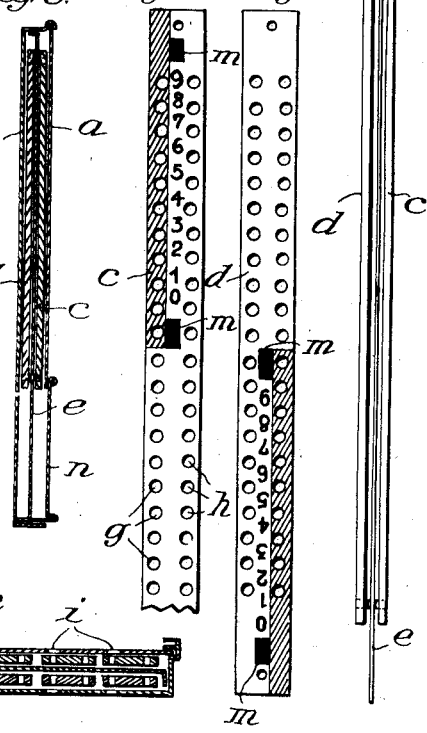
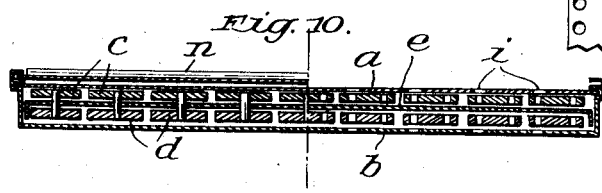
Inventors:
Carl Kübler
Otto Menter Aug. 17, 1926.

C. KÜBLER ET AL 1,596,108

CALCULATING MACHINE

Filed Jan. 15, 1921      5 Sheets-Sheet 3

Inventors:
Carl Kübler
Otto Meuter

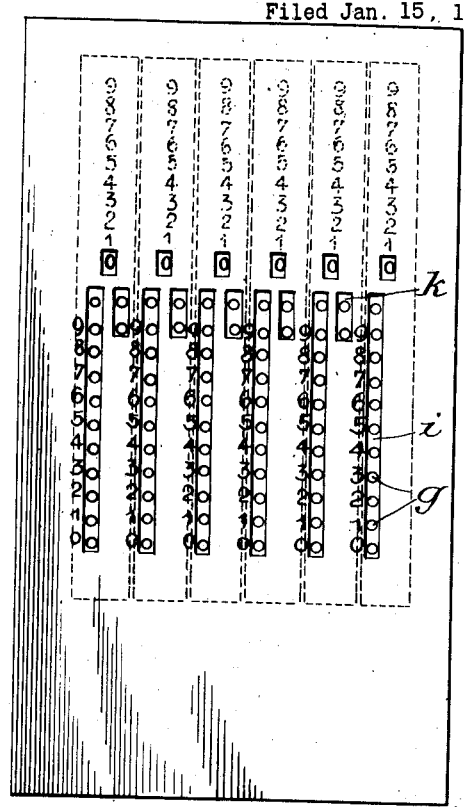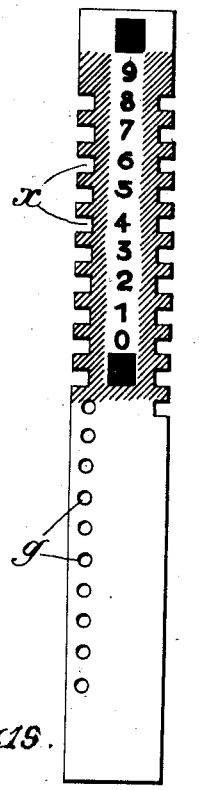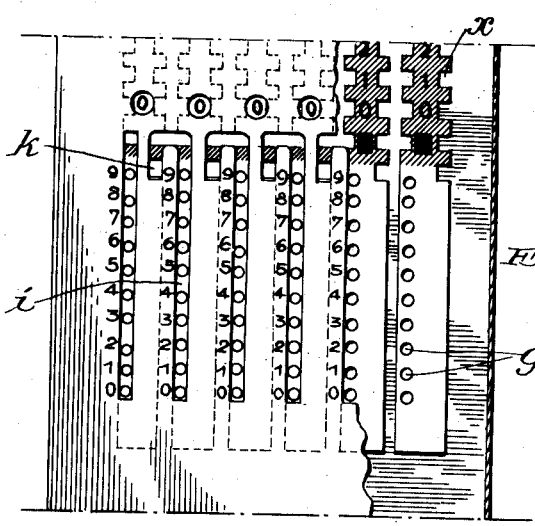

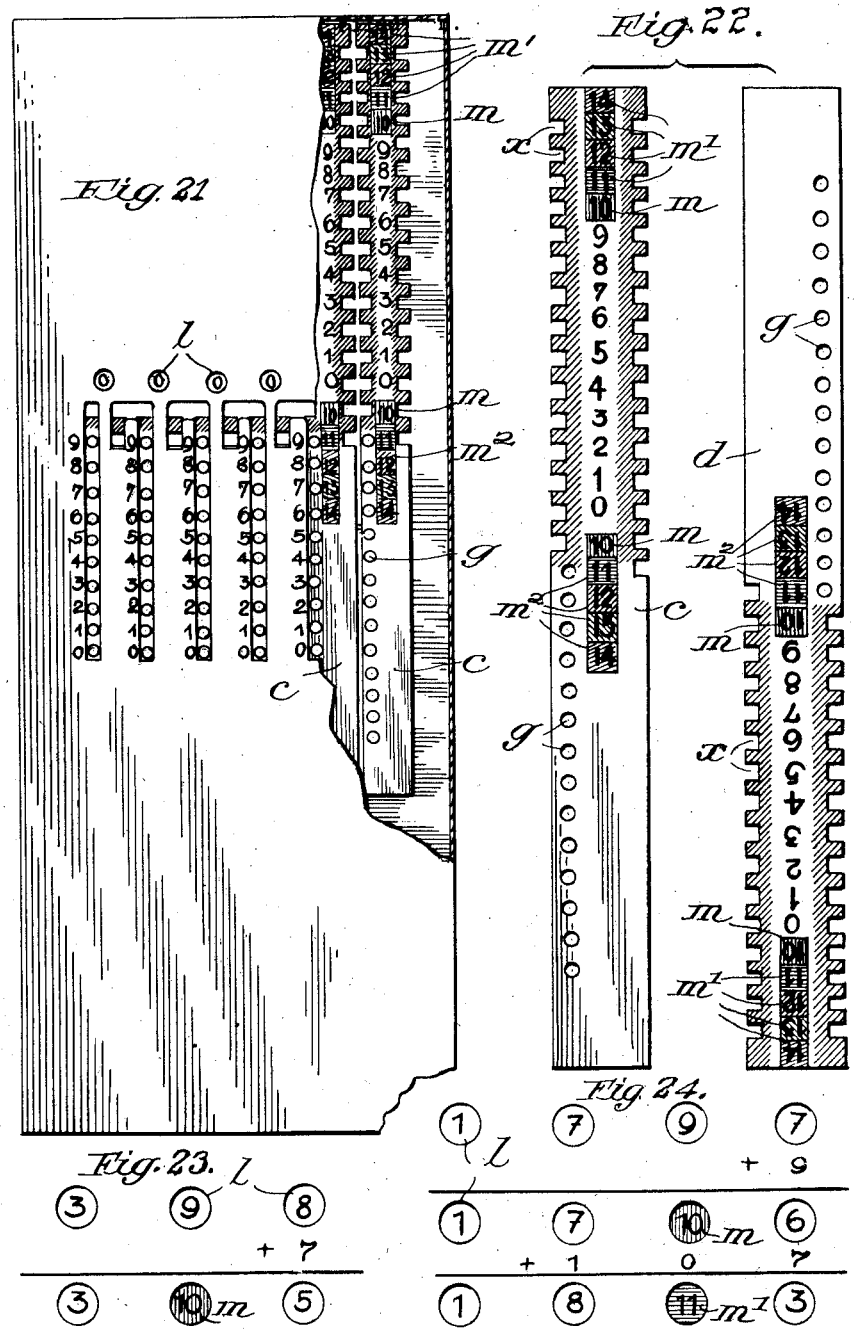

Patented Aug. 17, 1926.

1,596,108

UNITED STATES PATENT OFFICE.

CARL KÜBLER, OF BERLIN-WILMERSDORF, AND OTTO MEUTER, OF NOWAWES, GERMANY; SAID MEUTER ASSIGNOR TO SAID KÜBLER.

CALCULATING MACHINE.

(GRANTED UNDER THE PROVISIONS OF THE ACT OF MARCH 3, 1921, 41 STAT. L., 1313.)

Application filed January 15, 1921, Serial No. 437,610, and in Germany May 23, 1919.

This invention has for its object a calculation machine for addition and subtraction, which may also be used for multiplication and division.

Calculating machines with numbered sliders for addition and subtraction are known. In comparison with these devices the numbered sliders for the subtraction side, in the new machine according to the invention, are placed upside down on the rear side of the numbered sliders for the addition side, in such a manner that the addition numbers are displaced relatively to the subtraction numbers, so as to permit of the transfer of tens and hundreds, and so forth. For the purpose of automatically effecting the marking of the ten transfer into the next higher column, a signal is provided both above the figure 9 of the addition slider and below the figure 0 of the subtraction slider. Each of these signals receives an equalizing signal on the other numbered slider. Owing to this arrangement, a single rule of operation can be used for all kinds of calculation. This rule is:— Draw down the figure opening in the white field to the stop, slide upwards the figure opening in colored field and transfer. According to this rule addition and subtraction can be effected continuously and promiscuously. Sources of error are excluded as much as possible so that in spite of the simplest handling accurate and certain calculations can be effected without mental effort.

The machine can be constructed in the simplest manner, of paste board, sheet metal, celluloid, or the like, or it may be in the form of a book cover and arranged as a support for notes and the like.

In the drawings affixed to this specification and forming part thereof several modifications of a device embodying my invention are illustrated by way of example. In the drawings—

Fig. 1 is a plan of a machine of the simplest construction in the zero position as seen from the addition side.

Fig. 2 is a plan of the subtraction side or rear side of this machine in the upside down position and again in the zero position.

Fig. 3 shows the adjustment of the figure 421.75 on the addition side of the machine according to Fig. 1.

Fig. 4 shows the result of the movement of the figures after effecting an addition.

Fig. 5 shows the movement of the figures on the rear side after effecting a subtraction.

Fig. 6 is a plan of a grid or frame for guiding the numbered sliders in the form of construction according to Fig. 1.

Fig. 7 is a plan of the cover plate of the addition side of a modified form of construction with zero slider for moving the numbered sliders back into the zero position in unison.

Fig. 8 is a plan of the rear wall of the machine according to Fig. 7 after removing the cover plate and the grid with the numbered sliders.

Fig. 9 is a longitudinal section of a machine with the zero slider in the form of construction according to Fig. 7.

Fig. 10 is a section on line 10—10 of Fig. 7, to a larger scale.

Fig. 11 is a plan of an addition slider drawn to a larger scale.

Fig. 12 is a plan showing the symmetrical arrangement of the subtraction slider as seen from the rear side.

Fig. 13 shows the arangement and connection of both numbered sliders with the grid for effecting the positive figure movement.

Fig. 18 is a plan view of a calculating machine with the numbered sliders marked thereon.

Fig. 19 shows a part of the calculating machine with the adjusting slot in crutch form and a modified numbered slider, wherein a few sliders are exposed.

Fig. 20 shows this numbered slider in detail.

Fig. 21 illustrates a calculating machine wherein the numbered slider is provided with more than one signal for a number of transfers of tens placed one behind the other.

Fig. 22 is an illustration of a corresponding addition and subtraction slider.

Figs. 23, 24 are examples of calculations.

Figure 14:
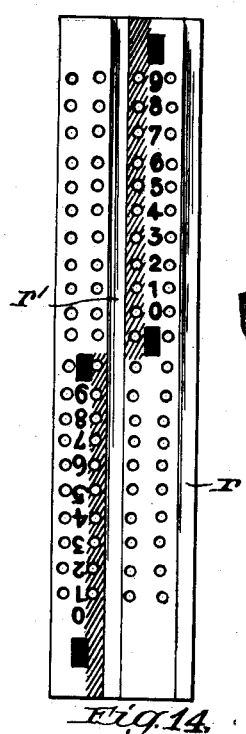
Fig. 14 shows addition and subtraction sliders in one piece before folding.

According to the invention, the numbered sliders rigidly connected together in any known manner are slidable underneath the openings in their cover plates in such a manner that after effecting a calculating operation the result is visible in the openings. For positively sliding the figures underneath the openings a slot is provided, also in the known manner, in any cover plates, for each row of figures, in which are exposed rows of holes provided in the numbered sliders for the movement thereof. By means of a pin inserted into one of these holes the numbered slider can be adjusted. In each slot 11 holes are exposed, namely, 10 for the decade, and a hole for the transfer of tens or hundreds. Each slider is provided with a row of at least 20 holes, preferably, however, 10 for the figures from 0–9, 10 for the figures from 9–0, and a position for the transfer of tens (a signal). Each slider contains a right hand and a left hand row of holes. The second row of holes appears in a short slot for two holes provided at the side of the long slots and serving for the transfer of tens.

The sliders have one of their rows of holes so marked that the 10 lower holes of the row of holes on the addition side, exposed beside the row of figures 0–9 in the zero position appear for example white, and the remainder red, the row of holes from 0–9 exposed simultaneously on the subtraction side red, and the remainder white.

By thus marking the holes an auxiliary means is provided for effecting the transfer of tens.

The device according to Fig. 1 consists of a cover plate $a$ for the upper or addition side, and a cover plate $b$ for th rear or subtraction side. Between both are slidably mounted numbered sliders $c$ and $d$. The numbered sliders $c$ on the addition side, and $d$ on the subtraction side, are connected together rigidly, so that a movement of the one produces an equal movement of the other. The mounting of the sliders connected together is preferably effected on a grid $e$ arranged between the two cover plates $a$ and $b$, in the slots of which the double sliders are movable. These numbered sliders $c$ and $d$ are, for the purpose hereinbefore described each provided with two rows of holes, each preferably of 21 holes $g$ and $h$. Between the rows of holes $g$ and $h$ there are applied in the upper half of the addition slider $c$ and upside down in the lower half of the subtraction slider $d$, the figures 0–9 and 9–0 respectively, and this in such a manner that a figure appears between two holes disposed at the same height.

The left hand row of holes is partly exposed by slots $i$ in the cover plates at the side of which the figures 0–9 are applied on the addition side, whilst 11 holes $g$ are exposed in the zero position, for example 10 holes marked white and one hole marked red. On the subtraction side, the slots are arranged symmetrically to the upside down figures and in the zero position 10 red holes and one white hole are exposed. Above the rows of holes $h$ short slots $k$ are provided in the cover plates $a$ and $b$, which permit of a movement of the numbered sliders through one step or one space between two holes.

Between and above each of the slots $i$ and $k$ an opening is provided in the cover plate $a$ in which the figures of the corresponding sliders are visible. The figures in the whole row of openings give the result of the calculation.

The slots $k$ and openings $l$ are arranged symmetrically at the lower ends of the slots $i$ in the cover plate $b$ on the subtraction side. If the reversed subtraction side comes uppermost after simultaneously turning through 180°, the slots $k$ and openings $l$ assume exactly the same position as in the cover plate $a$.

At each end of each of the rows of figures appearing in the slots $i$ there is also provided in all the numbered sliders a signal $m$. The signal indicates that a transfer must be effected to the next higher position, as hereinafter described.

The cover plates $a$ and $b$ are each provided with a marking for the addition and subtraction side and can be held together, enclosing all the movable parts, in any suitable manner.

As the holes $g$ in the slots $i$ lie accurately one above another, and the support is easily damaged by piercing through, the guiding slots of the grid $f$ may be interrupted at the middle, or a plate may be inserted (Fig. 6). On the subtraction side, the cover plate $b$ may be provided at the edges with a flange, and formed as a casing into which is inserted the grid, $f$, with the sliders and the upper cover plate $a$. (Figs. 6–10.)

In order to move the numbered sliders from their various positions back into the zero position, each slider may be adjusted by hand until the figure 0 appears in the opening $l$. A suitable zero slider $n$ is here preferably provided, which for example, is guided by the side walls of the casing $b$ and moves all the numbered sliders back into the zero position simultaneously by a projection (Fig. 9).

In order to effect a positive movement of the figures a pin is inserted into the hole $g$ opposite the number it is desired to add or subtract and the numbered slider, according to the color of the field in which the hole lies (red or white), is moved to the end of the slot or to the stop, upwards or downwards. If an operation requires a transfer of a ten the hole is always in the colored field. The movement will then be firstly always upwards and thereupon the transfer is effected by pulling downwards through one step the next slider in the small slot $k$ at the top on the left hand side.

Should the end of the row of figures be reached a signal $m$ appears and a transfer to the next higher position must be effected.

The use of the calculating machine will be described with reference to Figs. 1–6.

Assuming all the numbered sliders to have been moved into the zero position so that in all the openings $i$, the figure 0 appears, 421.75 shall now be added to 599.02.

The number 421.75 is first set up to the right beginning in the hundredth column. The number appears in the number opening 1. The number field has become partly red (shaded) and 599.02 is now added to the first number readable in the opening, by pulling the 2 downwards, beginning with the first column to the right, as the hole lies in the white field. The 0 in the second column remains stationary. Hereupon the 9 in the red field is moved upwards and at the side of this column in the small slot to the left the next higher position is pulled downwards. The next 9 in the tens column is again moved upwards effecting the transfer in the next column $k$; finally the 5 in the hundreds column is also moved upwards and transferred in the next left hand column $k$, so that the number 1020.77 appears in the openings 1 (Fig. 4). If 10.82 is to be subtracted from this number the apparatus is turned over and the number 1020.77 will be found automatically set up on the rear side. A pin is now inserted into the hundred column opposite 2 in the white field, and the slider moved downwards, a pin is now inserted opposite the 8 in the red field of the following column and the slider moved upwards and 9 appears in the opening 1. The transfer in the adjacent slot $k$ causes a signal to appear. This indicates that the next row must also be transferred in which case a pin is inserted opposite 0 and the whole red field pulled upwards so that a 9 appears and after effecting the transfer in the corresponding small slot $k$ a pin is inserted opposite to the 1 in the white field of the following column and the slider pulled downwards. The result 1009.95 will then appear in the openings $l$ (Fig. 5).

If a signal appears during the calculation this as a rule will be attended to in the manner herein before described.

The signal has the value and the indication of the number "10". It is of no importance for the final result whether this "10" be transferred immediately after the indication or as opportunity arises or even at the end of the calculating operations so long as it is effected. It has been proved that in practice it is frequently of great advantage to continue the calculation without regarding the signals as on further calculation they will automatically disappear in the calculation in most cases, so that the periodic transfer can be avoided. The result is not affected thereby. If at the conclusion of a calculation signals should remain in the openings 1 these will be attended to commencing at the highest position as hereinbefore described.

If for example the number 52816 is added to the number 99896, then the addition of 6 will cause the appearance of a signal and without disturbance or regard thereto the calculation is continued. The addition of 1 has no further effect, the 8 and 2 being added cause the appearance of signals while the addition of 5 causes all signals to disappear again.

In the openings 1 the number 152712 appears.

The very simple manipulation depends upon the features hereinbefore described which are not contained in the known machines.

It should be specially noted that combined account current calculations can be effected in the same manner.

Multiplication and division can be effected easily for example $79 \times 364 = 28756$. In this case the number 79 is first added in the 1 and 2 position as units commencing at the right, 4 times in succession, then in the 2 and 3 position as tens, 6 times and finally in the 3 and 4 position as hundreds, 3 times. The result is 28756. In the same manner as is habitual in the written method, any multiplication can be effected.

For division the process is quite similar, only on the minus side.

As it is of importance as regards the efficiency of the machine with rapid manipulation that the sliders do not move at the wrong time, so that the calculation would become incorrect, these may be so constructed that even with a comparatively light urge they will remain in the position into which they have been moved.

Figure 15:
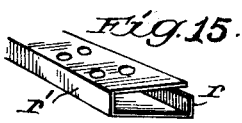
Fig. 15 shows a perspective illustration of the finished double slider for insertion.

This is effected in the form of construction shown in Figs. 14 and 15, by forming the addition and subtraction sliders $c$ and $d$ from a strip which is folded in the known manner, into the form of a casing, of rectangular cross section, so that the addition slider and the subtraction slider form the top and bottom sides, and the parts $r$ and $r^1$ the edges of the casing. As shown in Fig. 15 one of the sliders does not rest closely to the side edge $r$, but springs with a little play therefrom, and can thus after insertion be retained in the position into which it is moved by a light pressure on the cover plate.

In order to prevent piercing when the holes of both sliders are directly superposed, these can be displaced slightly relatively by correspondingly arranging the cover plate.

Figure 16:
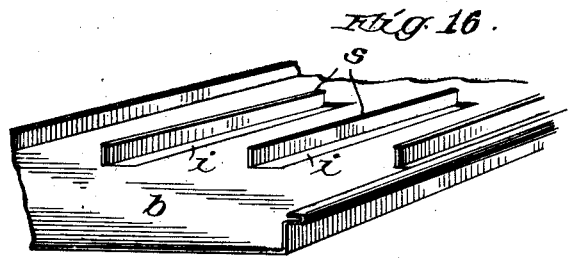
Figs. 16 and 17 illustrate the arrangement of a guide between the cover plates.
Figure 17:
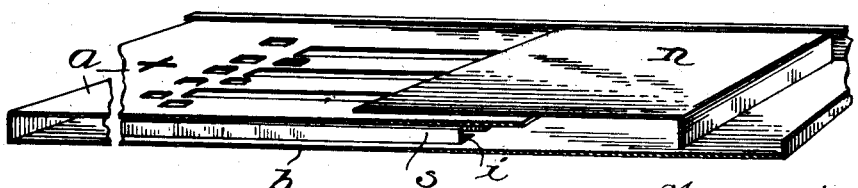

These numbered sliders can also rest against the cover plates by spring action. For increasing the rigidity of the box sliders whilst retaining the mobility for calculation as much as possible, a guide may be provided between the cover plates $a$ and $b$. This is effected in the simplest manner, as shown in Figs. 16 and 17, by bending inwards the parts $s$ stamped out to form the slots $i$ in the cover plates $a$ and $b$, and thus forming guide grooves for the box sliders. It would suffice if only the parts $s$ of one cover plate were bent upwards, but these guides may be formed equally well on both plates or alternately.

For simplifying the manipulation, the adjusting slots $i$ are connected to the short slots $k$ of the transfer of tens in such a manner that they form a single slot of hook shape.

Instead of rows of holes into which the adjusting pins are inserted the numbered sliders can be provided with tooth spaces on their edges. With such means it is possible when transferring tens, that is, when moving one numbered slider upwards directly from its tooth space into that of the adjacent higher numbered slider, to continue the movement to the end of the hook, and to move the numbered slider of the next higher stage.

As in the calculating machine hereinbefore described, the numbered slider is provided with a marking, which is visible in the adjusting slot and indicates when the slider is to be moved upwards or downwards wth the transfer of tens.

Known devices however, possess the disadvantage that the marking is easily overlooked by carelessness, and the adjustment effected in the wrong direction without noticing errors immediately. If it is desired to utilize the hook shaped slot and to obviate the faults this is effected as shown in Figs. 18-20, by providing the numbered slider with holes and tooth spaces in such a manner that the openings lying in the field of the transfer of tens are tooth spaces for the insertion of the pins, and the others are holes. In the red field therefore, tooth spaces are formed on both sides, and in the white field are holes. If the short slots and the adjusting slots $i$ are allowed to merge into one another in the form of a hook (Fig. 19) it is possible, as the numbered sliders are provided on both sides with tooth spaces, in all cases when moving upwards one of the numbered sliders, to effect a transfer of tens to move the adjusting pin up to the limit of the slot in the hook extension.

If meanwhile, all the tooth spaces below the marking limit in the left half of the numbered sliders, which necessitate a downward movement of the numbered sliders, are not formed as open tooth spaces, but as closed holes $g$, in the usual manner as above, an increased security against incorrect adjustment, and a reduction in the mental strain in the manipulation of the machine is obtained. As soon as an adjustment below the marking limit must be effected, for instance, for which a transfer of tens does not come into consideration, so that the numbered sliders must be drawn down to the lower limit of the adjusting slot, then by a careless upward movement, the adjusting pin will engage in a hole and be blocked at the upper end of the long adjusting slot, i. e. it will be prevented from entering into the hook $k$ for effecting a transfer of tens. The machine will thus immediately and automatically draw attention to a faulty adjustment of the numbered slider. This can be moved into the correct position by being moved back to the opposite end of the slot $i$ and the error obviated. In this way the entire calculating operation can be proceeded with undisturbed.

On the right hand lower half of the numbered sliders, the holes $g$ may be omitted as shown in Fig. 26, as they are not required for adjustment.

The reversed subtraction sliders are naturally constructed in the same manner.

In the calculating machine hereinbefore described, a signal is provided on the numbered sliders, which appears at the result openings when a ten must be transferred to the next higher stage. It has now been found that it is not necessary to remove this signal immediately each time during the calculation. They often disappear automatically during the course of the calculation, and it is much more practicable to remove the signal at the end of the calculation according to instructions.

As it also occurs that at one stage a number of tens must be successively transferred, the arrangement must be such that intead of the stationary signal another signal must be allowed to appear so that it is possible to continue the calculation without removing the signal. This is effected by providing a number of signal fields on each numbered slider, which can appear successively in the result openings as hereinafter described.

The arrangement of the signals $m$ is shown in Figs. 21 and 22 of the drawings. The arrangement of the numbered sliders may be the same as hereinbefore described. If additional signals $m^1$ are provided above the signal $m$ of the addition slider, it will be seen that by correspondingly lengthening the casing and moving the sliders $c$ further the signals $m^1$ can appear in the result openings in place of the signal $m$. Consequently corresponding tooth spaces $x$ must be provided in the numbered sliders for these signals $m^1$. The same arrangement is also effected symmetrically on the subtraction sliders which are correspondingly lengthened, so that both sliders can be connected together rigidly.

The method of operation will be explained most simply by examples of numbers as illustrated in Figs. 23 and 24. If for example the number 398 has been adjusted in the opening, and 7 is added, 5 will appear in the first result opening, in the second a signal $m$, in the third the 3 remains. If the number 1797 is adjusted in the result opening (Fig. 24) and the number 9 is added, then 6 will appear in the first opening, in the second again the usual signal $m$, whilst 7 and 1 remain in the third and fourth. If now the number 107 is added, 3 appears in the first opening, in the second opening a new signal $m^1$, namely 11, in the third window 8, and the $l$ remains in the fourth. These examples can be numerously repeated. It may occur that in the course of a calculation, one or more signals will disappear and again appear. It is essential that at the conclusion of a calculation care be taken that the signals be correctly removed. In this respect it must be observed that when removing the signals $m$ the number 0 appears in the result opening, whilst when removing the signals $m^1$ the corresponding stage will be adjusted in the opening according to the stage to which it relates. If in the example according to Fig. 24, the slider is raised, 1 will appear in the opening 1 and not 0. If a signal 12 is removed a 2 appears; if a signal 13 is removed a 3 appears, as will be understood, as according to the signals the value is obtained of the number of decades which are to be added to the next higher stage. The number of signals may be increased, the limit depending upon the size of the machine, and from the fact that a large number of transfers occurs comparatively rarely at one point.

As with the single signal $m$, the signals $m^1$ of the addition sliders, and the signals $m$, of the subtraction sliders, have equalizing signals $m^2$ on the substraction sliders and the addition sliders respectively, which permit of promiscuous calculation on the addition side and subtraction side of the machine. Naturally the number of holes must be increased in proportion to the number of signals $m^1$ and $m^2$. The manipulation of the machine is otherwise the same as with the other forms of construction.

Special stress must be laid upon the fact that each separate construction described can be used in combination with the arrangements thereinbefore or thereinafter described in the specification. None of the improvements are to be limited to the construction given as examples of the machine illustrated and described.

I claim:

1. A calculating machine slider, a row of figures on the slider, and a mark at one end of, and in line with, the row.

2. A calculating machine slider, a row of figures on the slider, and a mark at each end of, and in line with, the row.

3. A calculating machine comprising, a casing, a slot in one face of the casing, a slight aperture in the face of the casing for the slot, a slider movable in the casing parallel to the slot, a row of figures on the slider registrable with the sight aperture, the slider being movable to bring a portion thereof beyond the said row into registry with the sight aperture.

4. A calculating machine, comprising, a casing, a slot in one face of the casing, a sight aperture in the face of the casing for the slot, a slider movable in the casing parallel to the slot, a row of figures on the slider registrable with the sight aperture, the slider being movable to bring portions thereof beyond either end of said row into registry with the sight aperture.

5. A calculating machine, comprising, a casing, a slot in one face of the casing, a sight aperture in the face of the casing for the slot, a slider movable in the casing parallel to the slot, a row of figures on the slider registrable with the sight aperture, the slider being movable to bring a signal mark beyond said row, into registry with the sight aperture.

6. A calculating machine, comprising, a casing, a slot in one face of the casing, a sight aperture in the face of the casing for the slot, a slider movable in the casing parallel to the slot, a row of figures on the slider registrable with the sight aperture, the slider being movable to bring a signal mark beyond either end of said row, into registry with the sight aperture.

7. A calculating machine, comprising, a casing, a slot in one face of the casing, a sight aperture in the face of the casing for the slot, a slider movable in the casing parallel to the slot, a row of figures on the slider registrable with the sight aperture, the slider being movable to bring a plurality of signal marks beyond said row, into registry with the sight aperture.

8. A calculating machine, comprising, a casing, a slot in one face of the casing, a sight aperture in the face of the casing for the slot, a slider movable in the casing parallel to the slot, a row of figures on the slider registrable with the sight aperture, the slider being movable to bring a plurality of signal marks beyond either end of said row, into registry with the sight aperture.

9. A double faced calculating machine slider, a row of figures 0–9 on the upper half of one face of the slider, a row of figures 9–0 arranged upside down on the lower half of the other face of the slider, and spaced markers at each end of, and in line with, the two rows of figures.

In testimony whereof we have signed our names to this specification.

CARL KÜBLER.
OTTO MEUTER.